No. 874,133. PATENTED DEC. 17, 1907.
R. W. STEVENS.
MACHINE FOR CUTTING BUTTER.
APPLICATION FILED JULY 30, 1907.

6 SHEETS—SHEET 1.

Witnesses
Inventor
Robert W. Stevens
By Britton & Gray
Attorneys.

No. 874,133.

PATENTED DEC. 17, 1907.

R. W. STEVENS.
MACHINE FOR CUTTING BUTTER.
APPLICATION FILED JULY 30, 1907.

6 SHEETS—SHEET 4.

Witnesses
Jno Imrie
W. A. Williams

Inventor
Robert W. Stevens
By Britton & Gray
Attorneys

No. 874,133. PATENTED DEC. 17, 1907.
R. W. STEVENS.
MACHINE FOR CUTTING BUTTER.
APPLICATION FILED JULY 30, 1907.
6 SHEETS—SHEET 5.
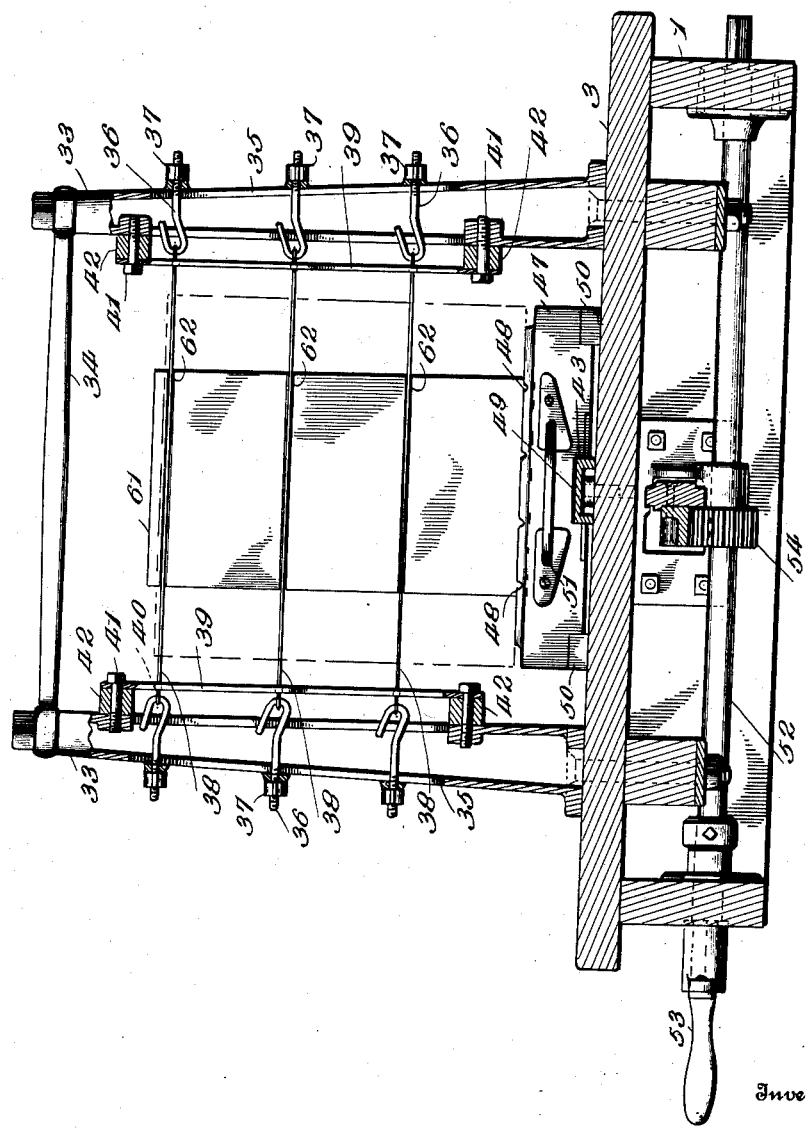
Witnesses
Inventor
Robert W. Stevens
By Britton & Gray
Attorneys No. 874,133. PATENTED DEC. 17, 1907.
R. W. STEVENS.
MACHINE FOR CUTTING BUTTER.
APPLICATION FILED JULY 30, 1907.
6 SHEETS—SHEET 6.
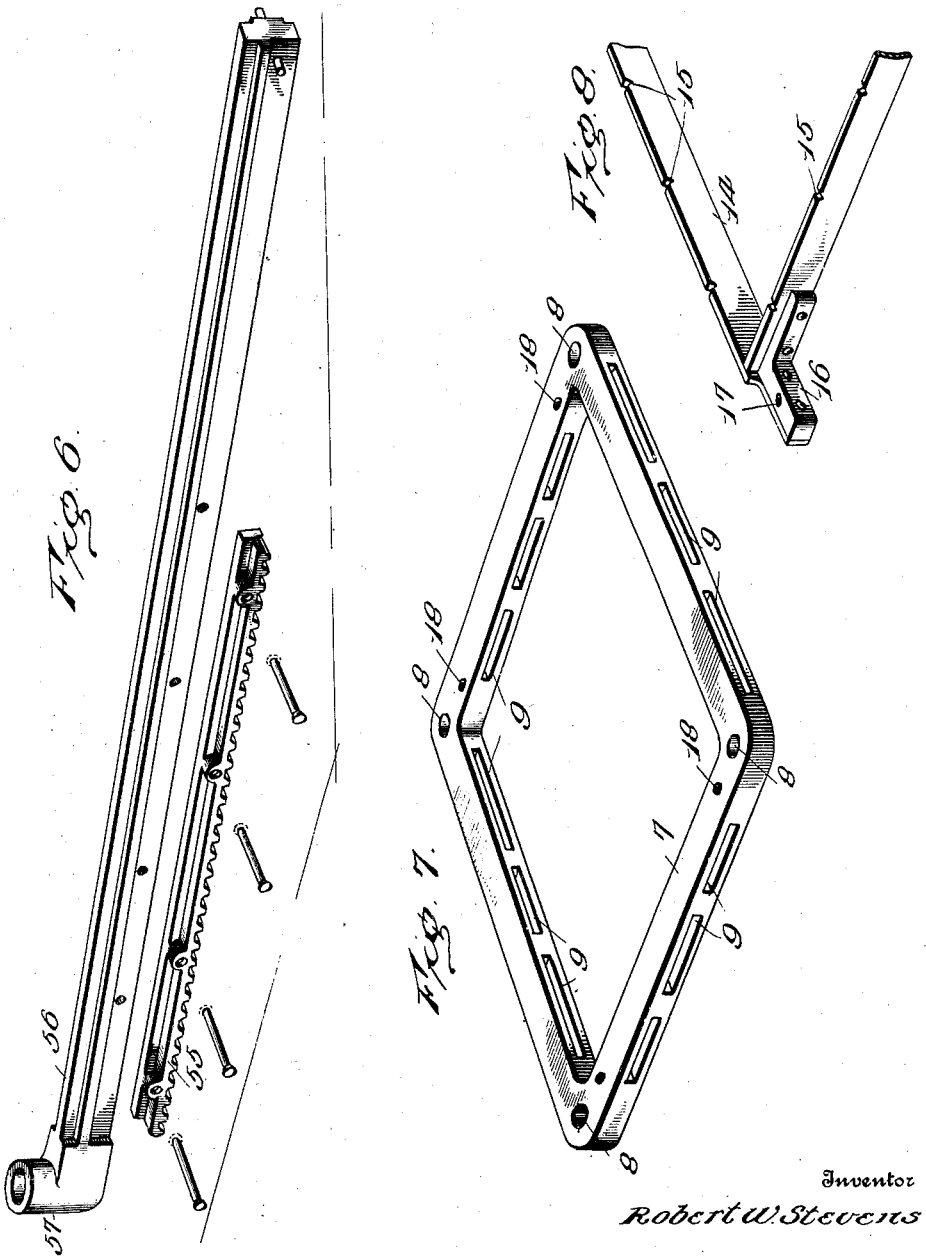

UNITED STATES PATENT OFFICE.

ROBERT W. STEVENS, OF BUTTE, MONTANA.

MACHINE FOR CUTTING BUTTER.

No. 874,133.　　　Specification of Letters Patent.　　　Patented Dec. 17, 1907.

Application filed July 30, 1907. Serial No. 386,235.

*To all whom it may concern:*

Be it known that I, ROBERT W. STEVENS, a citizen of the United States, residing at Butte, in the county of Silverbow and State of Montana, have invented certain new and useful Improvements in Machines for Cutting Butter, of which the following is a specification.

My invention relates to certain new and useful improvements in butter cutters, and the object of my invention is to produce a machine which is simple in construction and accurate in its operation, and one in which the parts may be adjusted for cutting prints of various sizes without loss of time and labor in making such adjustments.

With these objects in view, my invention consists in certain constructions, combinations and arrangements of parts, the preferred form of which will be first described in connection with the accompanying drawing, and then the invention particularly pointed out in the claims.

Figure 1:
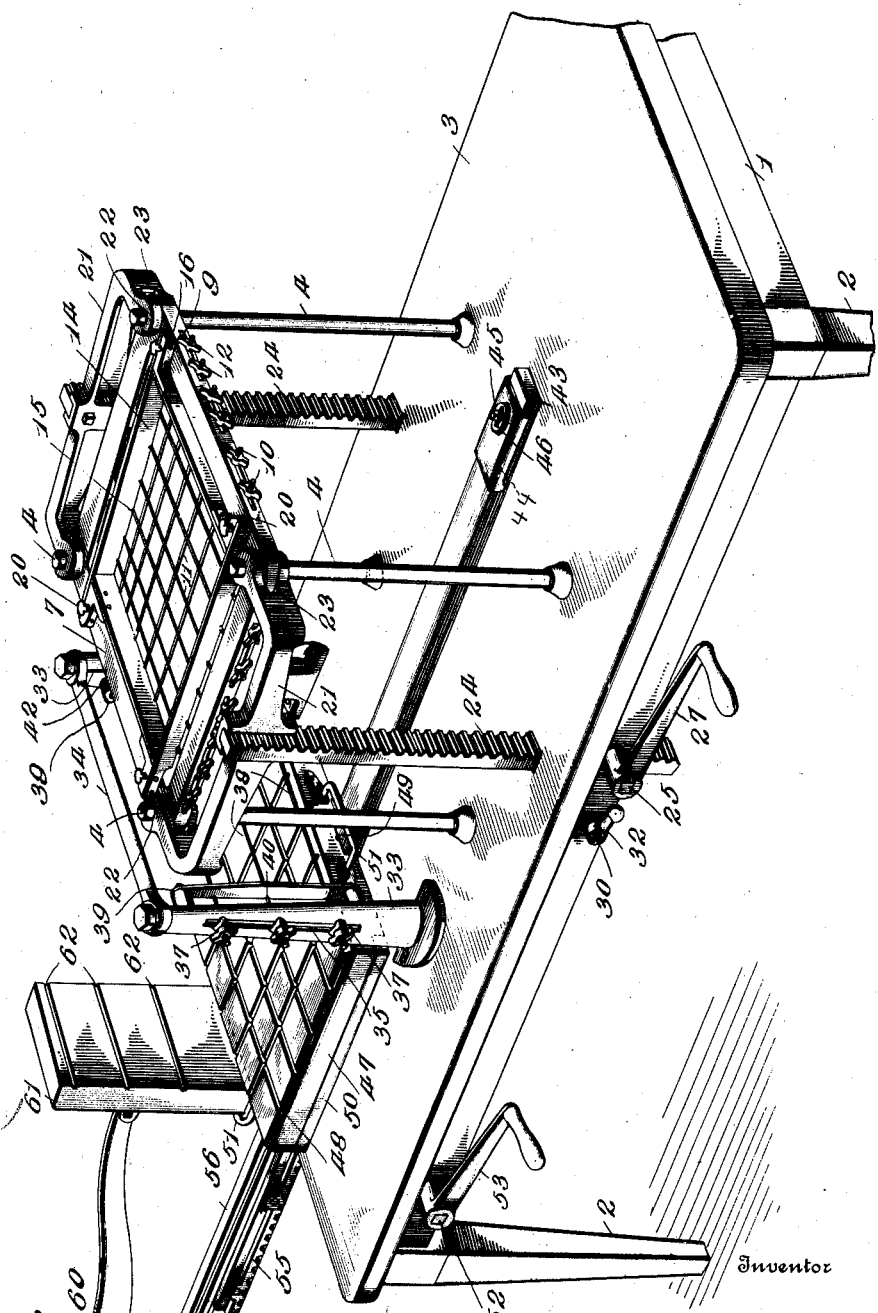
Figure 2:
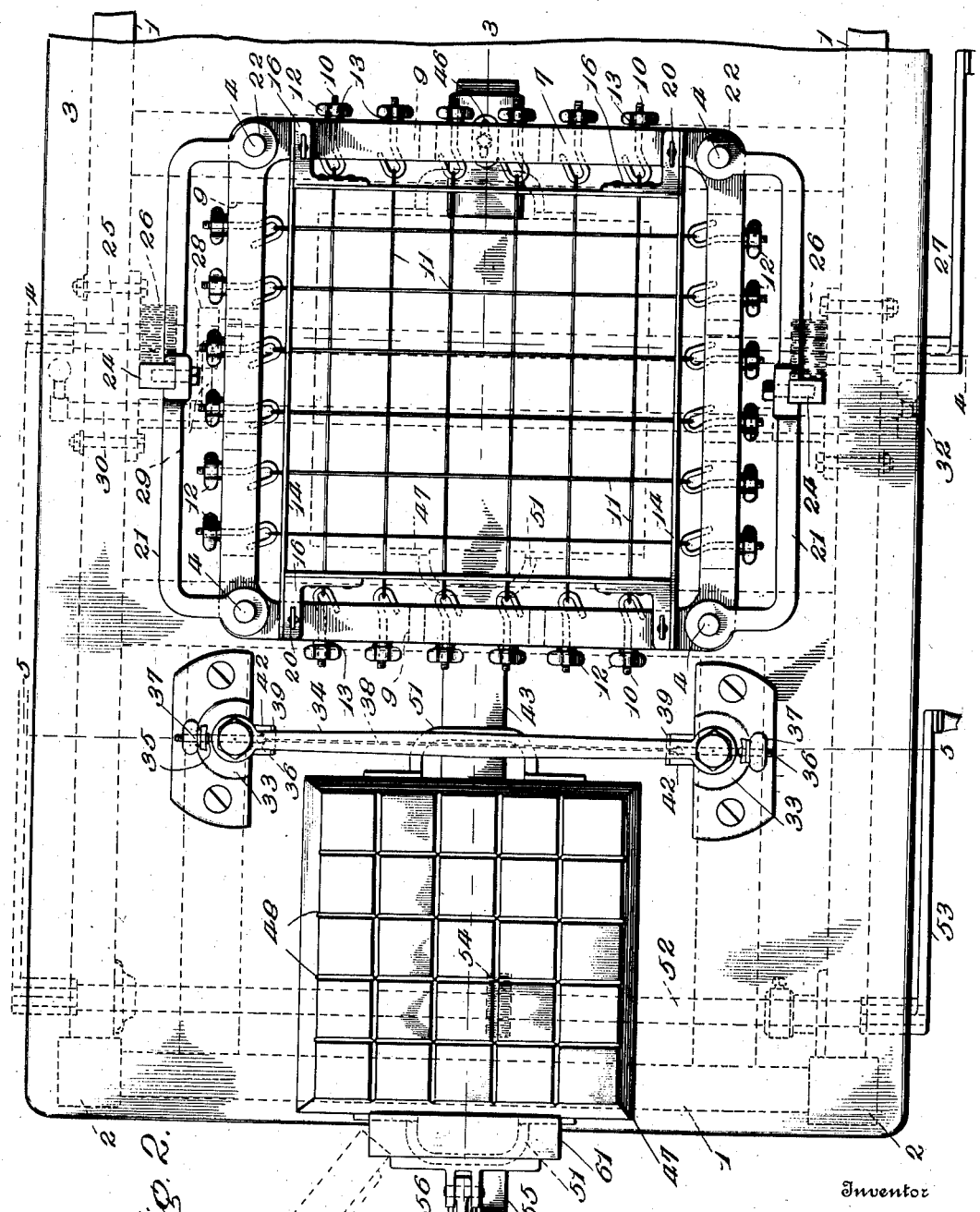
Figure 3:
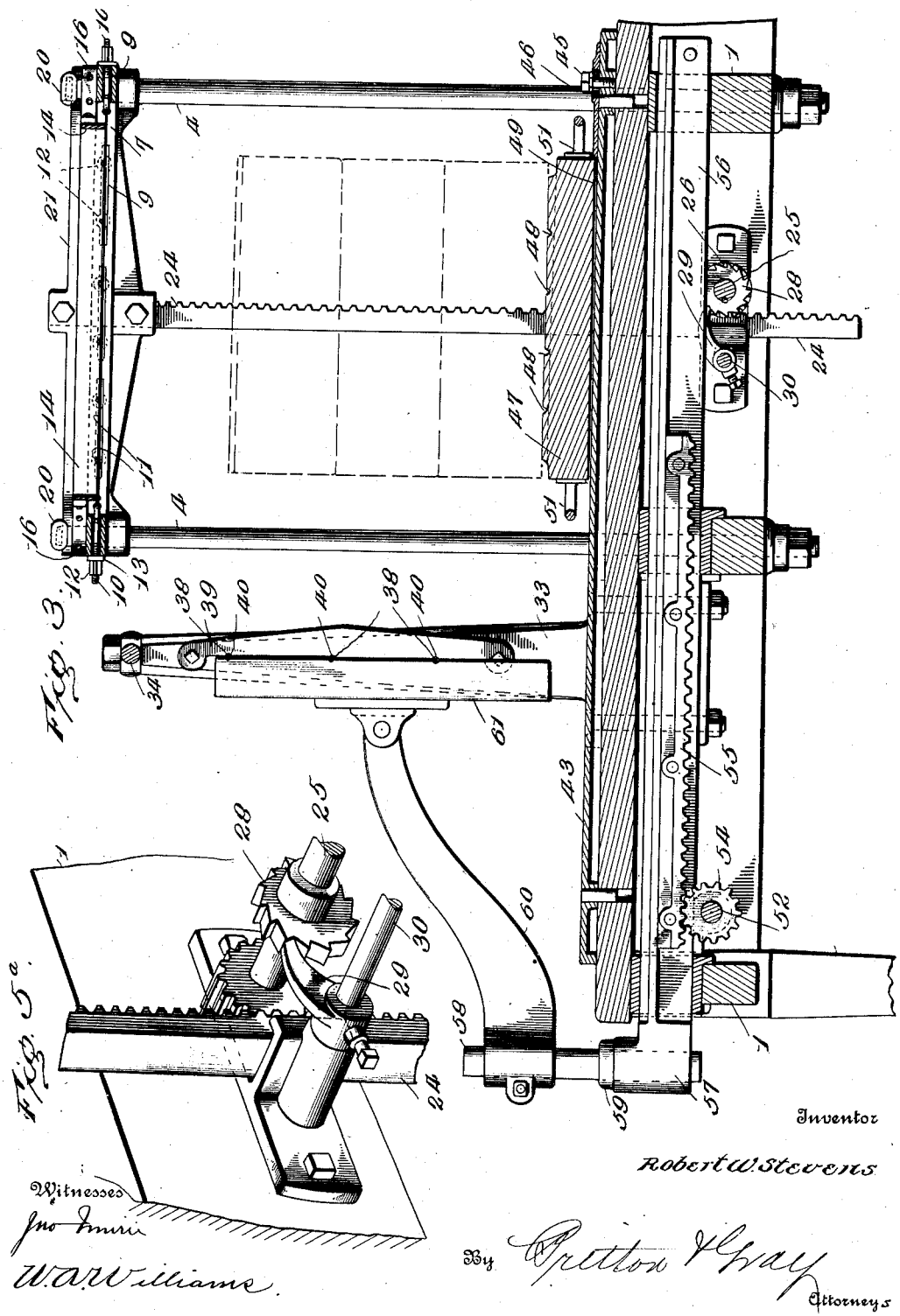
Figure 4:
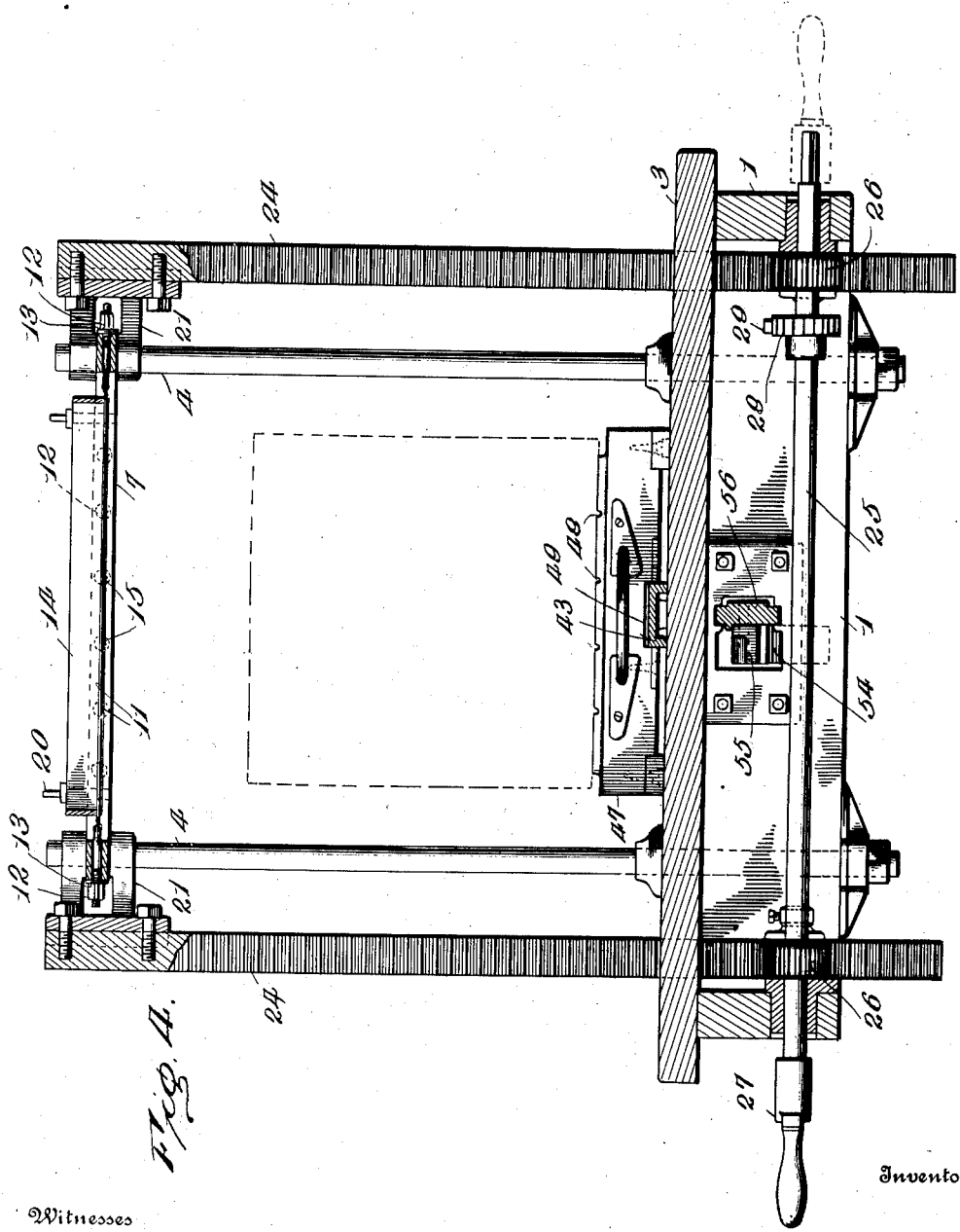

Referring to the drawings wherein I show the preferred embodiment of my invention, and wherein the same part is designated by the same reference numeral wherever it occurs, Figure 1 is a perspective view of the machine embodying my invention; Fig. 2 is a top plan view thereof; Fig. 3 is a central longitudinal section taken on line 3, 3, of Fig. 2, the parts being shown however in a slightly different position; Fig. 4 is a section taken at right angles to Fig. 3 on line 4, 4, of Fig. 2; Fig. 5 is a section taken on line 5, 5 of Fig. 2; Fig. 5ª is a detail perspective view of the mechanism for holding the frame in its raised position; Fig. 6 is a detail perspective view of the parts of a reciprocating bar and its rack; Fig. 7 is a detail perspective view of the wire holding frame, and Fig. 8 is a detail perspective view of one corner of the wire spacing frame.

1 designates the table frame standing on the legs 2, and 3 designates the top thereof, which preferably is formed of marble to add to the cleanliness of handling the butter. It is entirely immaterial however on what sort of a base the machine is mounted.

4 designates four posts mounted on the top 3 and extending upwardly therefrom. These posts are preferably, and as shown, arranged in the form of a rectangle.

7 designates a wire supporting frame shown in detail in Fig. 7. As best seen from this figure, the frame at its four corners is provided with openings 8 which are of a size to slide on the post 4. Through the sides of the frame are formed the slots 9 through which extend the hooks 10 carrying the cutting wires 11. The shanks of the hooks extend through the slots, and on the outer end of the hooks are thumb screws 12 preferably bearing on washers 13, by means of which the wires are held under the necessary tension. As will be noted, these wires may extend in both directions across the frame and divide the space within the frame into a series of rectangles, thus obviating the turning of the block of butter being cut, the size of the rectangles being varied by adjusting the hooks in the slots 9. The number of wires, as will be understood, varies with the size of cakes cut.

Mounted within the frame 7 is a spacing frame formed of four blades or bars 14, provided on the lower edge with notches 15. These bars are rigidly connected together by means of the corner brackets 16 provided with perforations 17 with which the tapped openings 18 in the frame 7 register.

20 are screws by means of which the frame formed by the blades 14 is removably secured to the frame 7.

Preferably I provide a plurality of spacing frames each having notches 15 laid off so as to produce the various sized cakes required or, if desired, a single frame may be provided with the various combinations of notches. Preferably, however, I use a frame having a single set of notches, and when it is desired to change the size of cake, remove the frame by taking out the four screws 20 and place a second frame in position, the wires carried by the frame 7 being adjusted so that they pass through the notches 15.

21 designates a pair of yokes bored at their ends at 22 to pass over the post 4, the ends of the yokes being slotted at 23 to provide openings into which the sides of the frame 7 pass, as best shown in Fig. 1, the depth of the slots 23 being sufficient to permit the projecting ends of the hooks 10 passing therethrough, so that by raising the yokes sufficiently to lift the frame 7 above the ends of the posts 4 the frame can be moved horizontally out from its position in the machine, and a frame adapted to cut a different size inserted, thus avoiding the delays incident to change of location of the wires or removing the spacing frame therefrom.

24 designates a pair of racks extending down from the central portion of the yoke 21 and through suitable openings in the table top 3.

25 designates a shaft mounted in suitable bearings in the frame 1 of the table, and provided with gears 26 engaging the racks.

27 is a handle mounted on one end of the shaft 25 by means of which the shaft is operated to raise and lower the frame 7. In order to hold the frame 7 at any desired height I provide on the shaft 25 a ratchet wheel 28, adapted to be engaged by a pawl 29 mounted upon a rock shaft 30 supported in suitable bearings in the frame 1. Preferably this rock shaft extends outside the frame, and at each end is provided with an operating handle 32, by means of which the pawl 29 can be thrown into and out of engagement with the ratchet wheel 28. Also if desired, for convenience, the shaft 25 may extend out from both sides of the machine and have an operating handle 27 at each end. By this construction it will be seen that the frame 7 can be positively held at any height desired.

In front of the posts 4 I mount a pair of pillars 33 which, at their base, are secured to the table top 3, and at their upper ends connected together by means of the brace 34. These pillars are longitudinally slotted as shown at 35, and 36 are hooks similar in construction to the hooks 10, and similarly provided with thumb screws 37, the hooks supporting the horizontal wires 38, by means of which the mass to be cut is sliced horizontally.

39 are a pair of spacing blades provided with notches 40, the blades being held in position by means of the bolts 41 passing through the spacing collars 42 and into the pillars or posts 33 above and below the slots 35. By means of the collars 42 the blades are held beyond the ends of the hooks 36.

43 designates a guiding strip running longitudinally and centrally of the table 3 and passing between pillars 33 and posts 4. Preferably this strip is removably secured to the table to facilitate cleaning. At its end beyond the posts 4, it is provided with a stop 44 held in position by means of a bolt 45 passing through an elongated slot 46 in the stop, whereby the position of the stop may be adjusted.

47 designates a block, preferably of wood, though it may be formed of any other material desired, which is scored longitudinally and transversely on its upper face with the grooves 48, the grooves in the top of the block corresponding to the setting given the wires 11 in the frame 7, and it is to be understood that various blocks are provided for the machine to correspond to the various settings which may be given the wires 11. The block 47 is provided centrally with a groove 49 with which the guide 43 engages. Preferably, and as shown, the block at its sides is provided with the supporting rails 50, which rest on the top of the table, holding the body of the block out of contact with the table and the guide 43. At each end I provide the block with a suitable handle 51, by means of which the block may be moved longitudinally of the guide in the operation of the machine, or lifted from the table.

52 designates a shaft mounted in suitable bearings in the frame 1 of the machine and provided on one or both ends, outside the frame, with an operating handle 53. In the central portion of the shaft is mounted a gear 54 adapted to mesh with a rack bar 55 formed or mounted on a bar 56 suitably guided to move beneath the table 3 parallel with the guide 43. At the outer end of the bar 56 I provide a bearing 57 for a supporting shaft 58, which is prevented from passing through the bearing by any suitable means, as by a collar 59 mounted on the shaft. Adjustably mounted upon the shaft 58 above the bearing 57 is an arm 60 to the outer end of which is pivotally mounted a pusher block 61. The block 61 is preferably provided in its front face with grooves 62 in line with the wires 38.

In the operation of my invention a block of butter or other similar material to be cut is placed upon the supporting block 47 with the block in the position shown in Fig. 1. The pressure block 61 is swung behind the center of the material and the height of the block 61 adjusted by adjusting the arm 60 on the shaft 58 until the block 61 bears against the central portion of the material. The shaft 58 and the pivotal connection between the arm 60 and the block 61 will, as will be seen, permit the block to adapt itself to the angle of the material to be cut. The handle 53 on the shaft 52 now being turned the gear 54 will operate through the rack 55 to force the block 61 forward and carry the material to be cut between the pillars 33. This will cause the wires 38 to cut the material into horizontal slabs or sections. When the wires have completely passed through the material they will pass into the slots 62 in the block 61 and complete the horizontal cut. One of the handles 51 is now taken hold of and the block 47 moved along the guide 43 until it comes into contact with the stop 44 which has been adjusted so as to center the material under the frame 7, the frame at this time being in the raised position shown in Fig. 1. The pawl 29 is now thrown out of engagement with its ratchet 28 by means of one of the operating handles 32 and by turning the crank 27 on the shaft 25 the gears 26 through the rack bars 24 draw down the frame and cause the wires to pass vertically through the butter or other material. This is continued until the wires pass completely through the butter and into the slots 48 in the block or bed 47. This operation cuts the butter into the desired sized cakes which, preferably, are removed while the frame is in its depressed position. After the cakes are removed the frame is raised, the block 61 moved back to its outer position, the block 47 drawn back to the position shown in Fig. 1, or removed from the machine, and the operation can then be repeated. As, has been stated, the wires for making the horizontal cuts are spaced by means of the blades 39, which can be readily changed to provide blades having a different number of notches, or their notches in different relative position, the wires 38 being adjusted by moving the hooks 36 in the slots 35. The wires 11, as has been already stated, are preferably adjusted for different sized cakes by changing the frames composed of the blades 14, and then adjusting the wires in the frame 7 so that they correspond with the notches in the spacing frame.

Preferably for the sake of cleanliness, all metal parts which are above the table and which therefore are apt to come into contact with the butter or other material being operated upon, are made of suitable non-corrodible metal. It is of course to be understood that they may be made of any other material if desired, though I have found by experiment that phosphor bronze is the most suitable metal to use, it being non-corrodible and not affected by the acids contained in the butter.

While I have claimed what I believe to be the preferred form of my invention, I desire to have it understood that many changes may be made in the form, construction and arrangement of parts without departing from the spirit of my invention.

What I claim as new and desire to secure by Letters Patent is

1. In a butter cutter, the combination with a frame, cutting wires mounted in the frame and a spacing frame constructed of bars secured together at their ends and supported by said first mentioned frame and extending within the same and engaging the wires to hold the same properly spaced.

2. In a butter cutter, the combination with an open frame, cutting wires extending across the same, a spacing frame constructed of bars connected together at their ends and carried by said first mentioned frame and extending within the same and engaging the wires to hold the same properly spaced.

3. In a butter cutter, the combination with a frame, cutting wires crossing the same, a spacing frame constructed of bars connected together at their ends and removably mounted on said first mentioned frame and extending within the same, and provided with notches adapted to engage the wires to hold the same properly spaced.

4. In a butter cutter, the combination with a support, a plurality of posts extending upwardly from the support, a cutting frame slidably mounted on the posts, yokes provided with openings through which the posts pass, said yokes being also provided with slots into which the frame extends, racks carried by the yokes and extending down through the support and a gear mechanism for operating the racks to raise and lower the frame.

5. In a butter cutter, a frame provided with slots through its sides, and oppositely disposed hooks mounted in said slots with their hook portion extending within the frame, wires connecting the hooks means carried by the hooks and pressing against the exterior of the frame for adjusting the tension of the wires a spacing frame constructed of bars secured together at their ends and supported by said first mentioned frame and extending within the same and engaging the wires to hold the same properly spaced.

6. In a butter cutter, the combination with a support, of a pair of posts mounted thereon, a wire extending between the posts, a block resting upon the support, a guide for guiding the block beneath the wire, a longitudinally reciprocating bar mounted beneath the support, means for reciprocating the bar, a pusher carried by the bar, and adapted to engage the material on the block and move the block beneath the wire for the purpose described.

7. In a butter cutter, the combination with a support, a pair of posts mounted thereon, a wire extending between the posts, a longitudinally reciprocating bar mounted beneath the support, an arm pivoted to the bar, a pusher block pivoted to the arm, the pivots of the arm and block being at right angles to each other, whereby said block may adjust itself to various shapes of material.

In testimony whereof I affix my signature in presence of two witnesses.

ROBERT W. STEVENS.

Witnesses:
L. P. SQUIER,
K. E. KLEIN.